(12) United States Patent
Muehlberghuber et al.

(10) Patent No.: US 12,498,472 B2
(45) Date of Patent: Dec. 16, 2025

(54) METHOD AND SYSTEM FOR GENERATING LOW LEVEL CONFIGURATION DATA FROM HIGH LEVEL CONFIGURATION DATA AT A PROBE CONNECTOR OF AN ULTRASOUND PROBE

(71) Applicant: GE Precision Healthcare LLC, Wauwatosa, WI (US)

(72) Inventors: Michael Muehlberghuber, Salzburg (AT); Reinhold Bruestle, Frankenburg am Hausruck (AT); Andreas Kremsl, St. Wolfgang (AT)

(73) Assignee: GE Precision Healthcare LLC, Waukesha, WI (US)

( * ) Notice: Subject to any disclaimer, the term of this patent is extended or adjusted under 35 U.S.C. 154(b) by 270 days.

(21) Appl. No.: 18/128,718

(22) Filed: Mar. 30, 2023

(65) Prior Publication Data

US 2024/0329223 A1 Oct. 3, 2024

(51) Int. Cl.
*G01S 7/52* (2006.01)
(52) U.S. Cl.
CPC ........ *G01S 7/5205* (2013.01); *G01S 7/52085* (2013.01)
(58) Field of Classification Search
None
See application file for complete search history.

(56) References Cited

U.S. PATENT DOCUMENTS

| | | | | |
|---|---|---|---|---|
| 4,811,740 A * | 3/1989 | Ikeda | .................... | G01N 29/262 600/459 |
| 5,520,187 A * | 5/1996 | Snyder | ................ | G01S 7/52034 600/447 |
| 6,436,048 B1 * | 8/2002 | Pesque | ................. | A61B 8/0891 600/447 |
| 8,500,645 B2 * | 8/2013 | Cohen | .................. | A61B 8/4483 600/443 |
| 10,974,073 B2 * | 4/2021 | Fontanarosa | ........ | A61B 8/4236 |
| 11,357,477 B2 * | 6/2022 | Duncan | .................... | A61B 8/06 |
| 2002/0045820 A1 * | 4/2002 | Pesque | .................. | G01S 7/5208 600/443 |
| 2005/0251035 A1 * | 11/2005 | Wong | ....................... | A61B 8/00 600/459 |

(Continued)

*Primary Examiner* — Isam A Alsomiri
*Assistant Examiner* — Jonathan D Armstrong
(74) *Attorney, Agent, or Firm* — McAndrews, Held & Malloy, Ltd.; Daniel Bissing; David Bates

(57) ABSTRACT

Systems and methods for generating low level configuration data from high level configuration data at a probe connector of an ultrasound probe are provided. The method includes receiving, from an ultrasound machine by at least one connector processor located in a probe connector of an ultrasound probe, high level configuration data. The method includes processing, by the at least one connector processor, the high level configuration data to generate low level configuration data. The method includes providing, by the at least one connector processor via a probe cable to at least one probe processor disposed in a housing of the ultrasound probe, the low level configuration data. The method includes causing, by the at least one probe processor, transducer elements of the ultrasound probe to transmit ultrasound beams and convert received echoes to ultrasound signals based on the low level configuration data.

20 Claims, 2 Drawing Sheets

(56) References Cited

U.S. PATENT DOCUMENTS

| | | | |
|---|---|---|---|
| 2009/0146695 A1* | 6/2009 | Schweizer | G01S 7/5208 |
| | | | 327/108 |
| 2009/0240152 A1* | 9/2009 | Angelsen | G10K 11/345 |
| | | | 600/447 |
| 2014/0121521 A1* | 5/2014 | Poland | A61B 8/145 |
| | | | 600/447 |
| 2015/0241397 A1* | 8/2015 | Savord | G01N 29/24 |
| | | | 600/459 |
| 2016/0106393 A1* | 4/2016 | Kameishi | B06B 1/0607 |
| | | | 600/459 |
| 2016/0238563 A1* | 8/2016 | Lee | G01S 7/52082 |
| 2017/0238902 A1 | 8/2017 | Lee et al. | |
| 2018/0229057 A1* | 8/2018 | Fontanarosa | A61N 5/1049 |
| 2020/0077982 A1* | 3/2020 | Duncan | A61B 8/06 |
| 2020/0121281 A1* | 4/2020 | Dagdeviren | A61B 8/4477 |
| 2021/0038925 A1 | 2/2021 | Emery | |
| 2022/0257216 A1* | 8/2022 | Duncan | A61B 8/481 |

* cited by examiner

METHOD AND SYSTEM FOR GENERATING LOW LEVEL CONFIGURATION DATA FROM HIGH LEVEL CONFIGURATION DATA AT A PROBE CONNECTOR OF AN ULTRASOUND PROBE

Certain embodiments relate to ultrasound imaging. More specifically, certain embodiments relate to a method and system for generating low level configuration data (e.g., transducer element configuration data, such as transducer element delay information) from high level configuration data (e.g., beam configuration data, such as aperture, waveform, focus, and the like) at a probe connector of an ultrasound probe.

BACKGROUND

Ultrasound imaging is a medical imaging technique for imaging organs and soft tissues in a human body. Ultrasound imaging uses real time, non-invasive high frequency sound waves to produce a series of two-dimensional (2D), three-dimensional (3D), and/or four-dimensional (4D) images.

Conventional ultrasound systems typically generate transducer element configuration data, such as delay information for each transducer element, at an ultrasound machine/console and communicate the transducer element configuration data to processing elements within the ultrasound probe. However, such systems require extensive hardware/software co-design, complex data synchronization, and high speed interfaces between the ultrasound machine/console and various different types of ultrasound probes that may be connected to the ultrasound machine/console. Accordingly, some ultrasound systems are moving the generation of the transducer element configuration data to processor(s) within the probe housing. However, the generation of the transducer element configuration data requires a significant amount of processing power, resulting in the use of actively cooled probes, which are expensive and offer poor ergonomics.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for generating low level configuration data from high level configuration data at a probe connector of an ultrasound probe, substantially as shown in and/or described in connection with at least one of the figures, as set forth more completely in the claims.

Various embodiments of the present disclosure describe an ultrasound probe that provides less power dissipation in the probe housing by performing the low level configuration data generation (e.g., delay computations) at the probe connector instead of within the probe housing, resulting in the reduction or elimination of probe cooling needs, which allows for improved ergonomics of the ultrasound probe housing. Furthermore, aspects of the present disclosure describe an ultrasound system that provides less computational requirements in the ultrasound machine by performing the low level configuration data generation (e.g., delay computations) at the probe connector instead of at the ultrasound machine, which may result in faster response times between the ultrasound probe and the ultrasound machine to improve usability of the ultrasound system. In addition, certain embodiments of the present disclosure reduce the amount of data transferred between the ultrasound machine and the ultrasound probe by transmitting the high level configuration data from the ultrasound machine to the ultrasound probe, instead of the substantially greater amount of data of the low level configuration data.

Aspects of the present disclosure provide a method and system for generating low level configuration data from high level configuration data at a probe connector of an ultrasound probe. In accordance with various embodiments, the method may comprise receiving, from an ultrasound machine by at least one connector processor located in a probe connector of an ultrasound probe, high level configuration data. The method may comprise processing, by the at least one connector processor, the high level configuration data to generate low level configuration data. The method may comprise providing, by the at least one connector processor via a probe cable to at least one probe processor disposed in a housing of the ultrasound probe 106, the low level configuration data. The method may comprise causing, by the at least one probe processor, transducer elements of the ultrasound probe to transmit ultrasound beams and convert received echoes to ultrasound signals based on the low level configuration data.

In an exemplary embodiment, the high level configuration data is beam configuration data comprising aperture, waveform, and/or focus. In a representative embodiment, the low level configuration data is transducer element configuration data comprising delays for the transducer elements. In various embodiments, the ultrasound probe is a four-dimensional (4D) probe. In certain embodiments, the at least one connector processor comprises one or both of a Field Programmable Gate Array (FPGA) or a System on a Chip (SoC). In an exemplary embodiment, the at least one probe processor comprises an Application-Specific Integrated Circuit (ASIC). In certain embodiments, the at least one probe processor is configured to perform sub-aperture beamforming based on the low level configuration data.

Various embodiments provide an ultrasound probe comprising a probe connector configured to generate low level configuration data from high level configuration data received from an ultrasound machine. The ultrasound probe may comprise at least one probe processor and transducer elements disposed in a probe housing. The ultrasound probe may comprise a probe connector configured to be received by an ultrasound machine. The probe connector may comprise at least one connector processor communicatively coupled to the at least one probe processor by a probe cable. The at least one connector processor is configured to receive high level configuration data from the ultrasound machine. The at least one connector processor is configured to process the high level configuration data to generate low level configuration data. The at least one connector processor is configured to provide the low level configuration data to the at least one probe processor via the probe cable. The at least one probe processor is configured to cause the transducer elements to transmit ultrasound beams and convert received echoes to ultrasound signals based on the low level configuration data.

In a representative embodiment, the high level configuration data is beam configuration data comprising aperture, waveform, and/or focus. In various embodiments, the low level configuration data is transducer element configuration data comprising delays for the transducer elements. In certain embodiments, the ultrasound probe is a four-dimensional (4D) probe. In an exemplary embodiment, the at least one connector processor comprises one or both of a Field Programmable Gate Array (FPGA) or a System on a Chip (SoC). In a representative embodiment, the at least one probe processor comprises an Application-Specific Integrated Circuit (ASIC). In various embodiments, the at least one probe processor is configured to perform sub-aperture beamforming based on the low level configuration data.

Certain embodiments provide an ultrasound system comprising an ultrasound machine and an ultrasound probe having a probe connector configured to generate low level configuration data from high level configuration data received from the ultrasound machine. The ultrasound system may comprise an ultrasound machine and an ultrasound probe. The ultrasound probe may comprise at least one probe processor and transducer elements disposed in a probe housing. The ultrasound probe may comprise a probe connector configured to be received by the ultrasound machine. The probe connector may comprise at least one connector processor communicatively coupled to the at least one probe processor by a probe cable. The at least one connector processor is configured to receive high level configuration data from the ultrasound machine. The at least one connector processor is configured to process the high level configuration data to generate low level configuration data. The at least one connector processor is configured to provide the low level configuration data to the at least one probe processor via the probe cable. The at least one probe processor is configured to cause the transducer elements to transmit ultrasound beams and convert received echoes to ultrasound signals based on the low level configuration data.

In various embodiments, the high level configuration data is beam configuration data comprising aperture, waveform, and/or focus. In certain embodiments, the low level configuration data is transducer element configuration data comprising delays for the transducer elements. In an exemplary embodiment, the ultrasound probe is a four-dimensional (4D) probe. In a representative embodiment, the at least one connector processor comprises one or both of a Field Programmable Gate Array (FPGA) or a System on a Chip (SoC). In various embodiments, the at least one probe processor comprises an Application-Specific Integrated Circuit (ASIC).

These and other advantages, aspects and novel features of the present disclosure, as well as details of an illustrated embodiment thereof, will be more fully understood from the following description and drawings.

DETAILED DESCRIPTION

Figure 1:
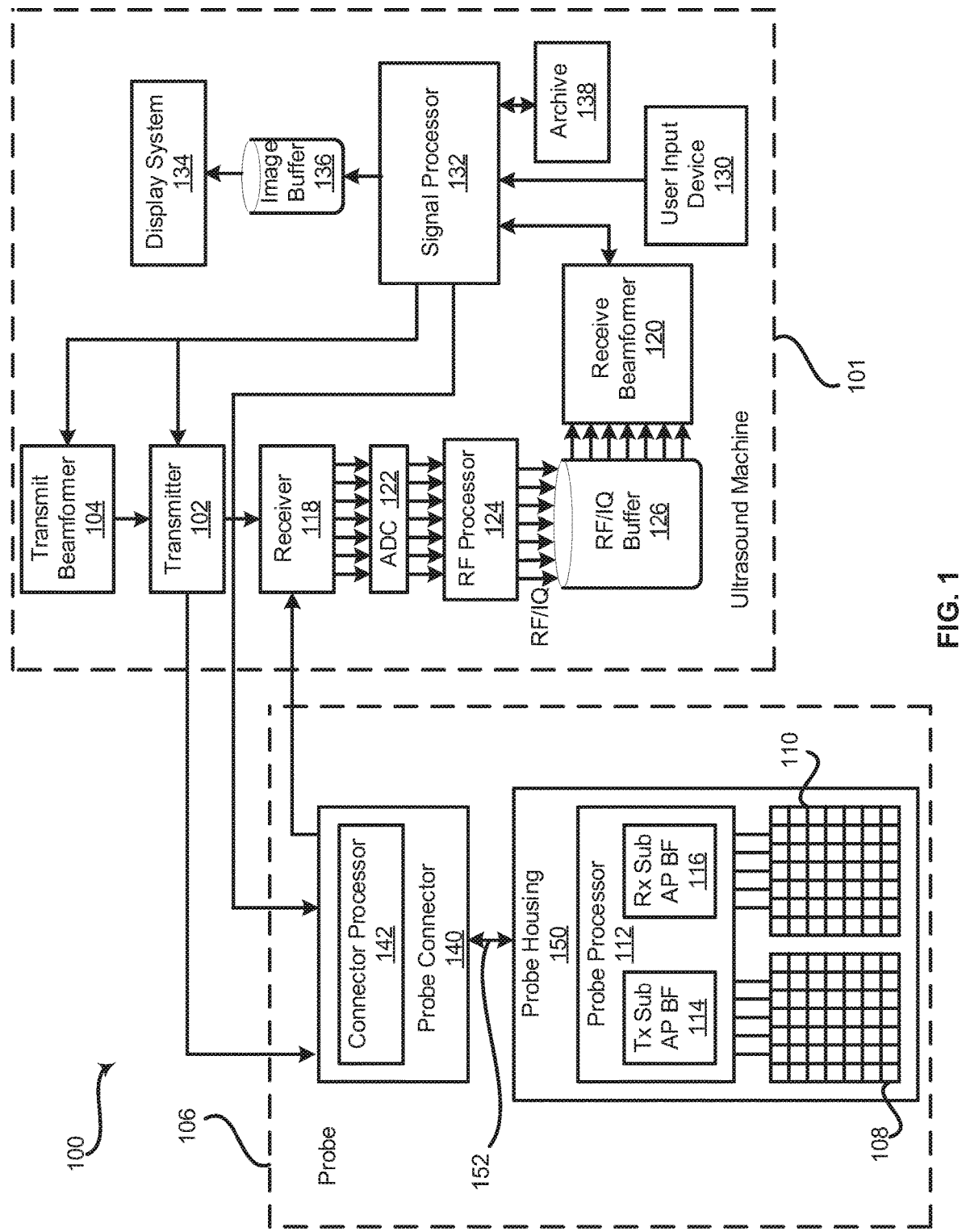
FIG. 1 is a block diagram of an exemplary ultrasound system comprising an ultrasound probe having a probe connector that is operable to generate low level configuration data from high level configuration data received from an ultrasound machine/console, in accordance with various embodiments.

Certain embodiments may be found in a method and system for generating low level configuration data from high level configuration data at a probe connector of an ultrasound probe. Aspects of the present disclosure have the technical effect of generating the low level data in closer proximity to the ultrasound probe than the ultrasound machine/console. Various embodiments have the technical effect of avoiding the need for extensive hardware/software co-design, complex data synchronization, and high speed interfaces between the ultrasound machine/console and various different types of ultrasound probes. Certain embodiments have the technical effect of avoiding the need to use actively cooled ultrasound probes in order to provide the processing power needed to generate low level configuration data within a housing of an ultrasound probe.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general-purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized, and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising", "including", or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode, which can be one-dimensional (1D), two-dimensional (2D), three-dimensional (3D), or four-dimensional (4D), and comprising Brightness mode (B-mode), Motion mode (M-mode), Color Motion mode (CM-mode), Color Flow mode (CF-mode), Pulsed Wave (PW) Doppler, Continuous Wave (CW) Doppler, Contrast Enhanced Ultrasound (CEUS), and/or sub-modes of B-mode and/or CF-mode such as Harmonic Imaging, Shear Wave Elasticity Imaging (SWEI), Strain Elastography, Tissue Velocity Imaging (TVI), Power Doppler Imaging (PDI), B-flow, Micro Vascular Imaging (MVI), Ultrasound-Guided Attenuation Parameter (UGAP), and the like.

Furthermore, the term processor or processing unit, as used herein, refers to any type of processing unit that can carry out the required calculations needed for the various embodiments, such as single or multi-core Central Processing Unit (CPU), Accelerated Processing Unit (APU), Graphic Processing Unit (GPU), Digital Signal Processor (DSP), Field Programmable Gate Array (FPGA), System on a Chip (SoC), Application-Specific Integrated Circuit (ASIC), or a combination thereof.

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

FIG. 1 is a block diagram of an exemplary ultrasound system 100 comprising an ultrasound probe 106 having a probe connector 140 that is operable to generate low level configuration data from high level configuration data received from an ultrasound machine/console 101, in accordance with various embodiments. Referring to FIG. 1, there is shown an ultrasound system 100. The ultrasound system 100 comprises an ultrasound console/machine 101 and an ultrasound probe 106. The ultrasound probe 106 comprises at least one probe processor 112 and transducer elements 108, 110 disposed in a probe housing 150 (also referred to as a probe body or probe handle). The ultrasound probe 106 further comprises a probe connector 140 comprising at least one connector processor 142. The probe connector 140 may be communicatively coupled to the probe housing 150 via a probe cable 152, for example. The ultrasound machine 101 (also referred to as an ultrasound console) comprises a transmitter 102, a transmit beamformer 104, a receiver 118, a receive beamformer 120, A/D converters 122, a RF processor 124, a RF/IQ buffer 126, a user input device 130, a signal processor 132, an image buffer 136, a display system 134, and an archive 138. The ultrasound machine 101 may be a standard console, a miniaturized ultrasound system, and/or any suitable ultrasound system.

The transmit beamformer 104 may comprise suitable logic, circuitry, interfaces and/or code that may be operable to control the transmitter 102. The transmitter 102 may comprise suitable logic, circuitry, interfaces and/or code that may be operable to communicate high level configuration data for driving an ultrasound probe 106 to a connector processor 142 of a probe connector 140 of the ultrasound probe 106. The transmitter 102 may be configured to receive transmit and receive settings for driving the ultrasound probe 106 from the transmit beamformer 104 and/or the signal processor 132. For example, the transmitter 102 may receive transmit and receive settings such as a transmit frequency, receive frequency, waveform shape, bandwidth, and/or any suitable transmit and receive settings from the transmit beamformer 104 and/or the signal processor 132. The transmitter 102 may be configured to communicate high level configuration data based on the transmit and receive settings. For example, the high level configuration data may comprise beam configuration data, such as aperture, waveform, focus, and the like.

The ultrasound probe 106 comprises at least one probe processor 112 and transducer elements 108, 110 disposed in a probe housing 150. The at least one probe processor 112 may be one or more Application-Specific Integrated Circuits (ASICs) or any suitable processing element. In various embodiments, the probe processor 112 may optionally comprise a transmit sub-aperture beamformer 114 and a receive sub-aperture beamformer 116.

The ultrasound probe 106 further comprises a probe connector 140 comprising at least one connector processor 142. The at least one connector processor 142 may be one or more Field Programmable Gate Arrays (FPGA), one or more System on a Chip (SoC), and/or any suitable processing element. The probe connector 140 is communicatively coupled to the probe housing 150 by a probe cable 152. The probe connector 140 is operable to electrically connect with the ultrasound console/machine 101 to facilitate communication between the ultrasound console/machine 101 and the ultrasound probe 106. For example, the probe connector 140 may be configured to be received by a port in the ultrasound machine/console 101 to provide the electrical connection between the ultrasound machine/console 101 and the ultrasound probe 106.

The at least one connector processor 142 of the probe connector 140 may comprise suitable logic, circuitry, interfaces and/or code that may be operable to translate the high level configuration data received from the transmitter 102 of the ultrasound machine 101 to generate low level configuration data that is communicated to the at least one probe processor 112. For example, the low level configuration data may comprise transducer element configuration data, such as transducer element transmit delay information (e.g., a transmit grid defining the beam center trajectories of the transmit beams that is used to determine the delay for each transducer element 108) and receive delay information for each transducer element 110. As used herein, the term "low level configuration data" refers to a greater amount of detailed configuration information (e.g., on an element by element basis) derived from the "high level configuration data," which refers to a smaller amount of generalized configuration information. In various embodiments, the processing performed by the at least one connector processor 142 to generate the low level configuration data is customized to the specific probe type and arrangement of transducer elements 108, 110 of the particular ultrasound probe 106. The low level configuration data generated by the connector processor 142 of the probe connector 140 is provided to the probe processor 112 of the ultrasound probe 106 which, through a transmit sub-aperture beamformer 114, drives a group of transmit transducer elements 108 to emit ultrasonic transmit signals into a region of interest (e.g., human, animal, underground cavity, physical structure and the like). In various embodiments, the transmit sub-aperture beamformer 114 may not be included. In an exemplary embodiment, the at least one probe processor 112 and the at least one connector processor 142 may be capable of executing any of the method(s) and/or set(s) of instructions discussed herein in accordance with the various embodiments, for example.

The ultrasound probe 106 may be a phased array, linear array, curved array, or any suitable shape or combination of shapes. The ultrasound probe 106 may be a one-dimensional (1D) probe, a two-dimensional (2D) probe, a three-dimensional (3D) probe, a four-dimensional (4D) probe (e.g., an electronic 4D (c4D) probe), or any suitable ultrasound probe. The ultrasound probe 106 may comprise an array of transducer elements, such as piezoelectric elements, micromachined elements, piezoelectric micromachined ultrasound transducers (PMUT) elements, capacitive micromachined ultrasound transducers (CMUT) elements, and/or any suitable transducer elements capable of converting control signals to acoustic energy and converting acoustic energy to ultrasound signals. The ultrasound probe 106 may comprise a group of transmit transducer elements 108 and a group of receive transducer elements 110, that normally constitute the same elements. The group of transmit transducer elements 108 may emit ultrasonic signals into a target. In a representative embodiment, the ultrasound probe 106 may be operable to acquire ultrasound image data covering at least a substantial portion of an anatomy, such as a heart, fetus, blood vessels, pelvic region, or any suitable anatomical region. The transmitted ultrasonic signals may be back-scattered from structures in the object of interest, like blood cells or tissue, to produce echoes. The echoes are received by the receive transducer elements 110.

The group of receive transducer elements 110 in the ultrasound probe 106, under the control of the probe processor 112, may be operable to convert the received echoes into analog signals, which undergo sub-aperture beamforming by a receive sub-aperture beamformer 116 and are then communicated to a receiver 118 via the probe connector 140. In various embodiments, the receive sub-aperture beamformer 116 may not be included. The probe processor 112 may be configured to apply the appropriate receive delays to the received signals as defined by the low level configuration data received from the at least one connector processor 142. The receiver 118 may comprise suitable logic, circuitry, interfaces and/or code that may be operable to receive the signals from the receive sub-aperture beamformer 116 and/or receive transducer elements 110 via the probe cable 152 and the probe connector 140. The analog signals may be communicated to one or more of the plurality of A/D converters 122.

The plurality of A/D converters 122 may comprise suitable logic, circuitry, interfaces and/or code that may be operable to convert the analog signals from the receiver 118 to corresponding digital signals. The plurality of A/D converters 122 are disposed between the receiver 118 and the RF processor 124. Notwithstanding, the disclosure is not limited in this regard. Accordingly, in some embodiments, the plurality of A/D converters 122 may be integrated within the receiver 118 or in the probe 106.

The RF processor 124 may comprise suitable logic, circuitry, interfaces and/or code that may be operable to demodulate the digital signals output by the plurality of A/D converters 122. In accordance with an embodiment, the RF processor 124 may comprise a complex demodulator (not shown) that is operable to demodulate the digital signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The receive beamformer 120 may comprise suitable logic, circuitry, interfaces and/or code that may be operable to perform digital beamforming processing to, for example, sum the delayed channel signals received from the RF processor 124 via the RF/IQ buffer 126 and output a beam summed signal. The resulting processed information may be the beam summed signal that is output from the receive beamformer 120 and communicated to the signal processor 132. In accordance with some embodiments, the receiver 118, the plurality of A/D converters 122, the RF processor 124, and the receive beamformer 120 may be integrated into a single beamformer, which may be digital. In various embodiments, the ultrasound system 100 comprises a plurality of receive beamformers 120.

The user input device 130 may be utilized to input patient data, scan parameters, settings, select protocols and/or templates, and the like. In an exemplary embodiment, the user input device 130 may be operable to configure, manage and/or control operation of one or more components and/or modules in the ultrasound system 100. In this regard, the user input device 130 may be operable to configure, manage and/or control operation of the transmitter 102, the ultrasound probe 106, the transmit beamformer 104, the receiver 118, the receive beamformer 120, the RF processor 124, the RF/IQ buffer 126, the signal processor 132, the image buffer 136, the display system 134, and/or the archive 138. The user input device 130 may include button(s), rotary encoder(s), a touchscreen, motion tracking, voice recognition, a mousing device, keyboard, camera and/or any other device capable of receiving a user directive. In certain embodiments, one or more of the user input devices 130 may be integrated into other components, such as the display system 134 or the ultrasound probe 106, for example. As an example, the user input device 130 may include a touchscreen display.

The signal processor 132 may comprise suitable logic, circuitry, interfaces and/or code that may be operable to process ultrasound scan data (i.e., summed IQ signal) for generating ultrasound images for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform display processing and/or control processing, among other things. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In various embodiments, the processed image data can be presented at the display system 134 and/or may be stored at the archive 138. The archive 138 may be a local archive, a Picture Archiving and Communication System (PACS), or any suitable device for storing images and related information.

The signal processor 132 may be one or more processing units, microprocessors, microcontrollers, GPU, and/or the like. The signal processor 132 may be an integrated component, or may be distributed across various locations, for example. The signal processor 132 may be capable of receiving input information from a user input device 130 and/or archive 138, generating an output displayable by a display system 134, and manipulating the output in response to input information from a user input device 130, among other things.

The ultrasound system 100 may be operable to continuously acquire ultrasound scan data at a frame rate that is suitable for the imaging situation in question. Typical frame rates range from 20-120 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several minutes' worth of frames of ultrasound scan data but it can also store less. The frames of ultrasound scan data are stored in a manner to facilitate retrieval thereof according to its order or time of acquisition. The image buffer 136 may be embodied as any known data storage medium.

The signal processor 132 may comprise suitable logic, circuitry, interfaces and/or code that may be operable to setup settings for an ultrasound scan. For example, the signal processor 132 may communicate with the transmitter 102 and/or the transmit beamformer 104 to provide transmit settings, such as a transmit frequency, waveform shape, bandwidth, and the like. Furthermore, the signal processor 132 may communicate with the receive beamformer 120 and/or otherwise provide a receive frequency for processing of the received ultrasound signals. The selection of various aspects of the imaging frequency (i.e., transmit and/or receive frequencies), waveform shape, bandwidth, and the like may be based in part on an imaging mode and imaging settings within the imaging mode. In various embodiments, the signal processor 132 may comprise suitable logic, circuitry, interfaces and/or code that may be operable to communicate the high level configuration data for driving the ultrasound probe 106 to the connector processor 142 of the probe connector 140 of the ultrasound probe 106. For example, the signal processor 132 may directly communicate the high level configuration data to the connector processor 142. The high level configuration data may comprise beam configuration data, such as aperture, waveform, focus, and the like as described above.

Still referring to FIG. 1, the display system 134 may be any device capable of communicating visual information to a user. For example, a display system 134 may include a liquid crystal display, a light emitting diode display, and/or any suitable display or displays. The display system 134 can be operable to present the ultrasound images and/or any suitable information.

The archive 138 may be one or more computer-readable memories integrated with the ultrasound system 100 and/or communicatively coupled (e.g., over a network) to the ultrasound system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive 138 may include databases, libraries, sets of information, or other storage accessed by and/or incorporated with the signal processor 132, for example. The archive 138 may be able to store data temporarily or permanently, for example. The archive 138 may be capable of storing medical image data, data generated by the signal processor 132, and/or instructions readable by the signal processor 132, among other things.

Components of the ultrasound system 100 may be implemented in software, hardware, firmware, and/or the like. The various components of the ultrasound system 100 may be communicatively linked. Components of the ultrasound system 100 may be implemented separately and/or integrated in various forms. For example, the display system 134 and the user input device 130 may be integrated as a touchscreen display.

Figure 2:
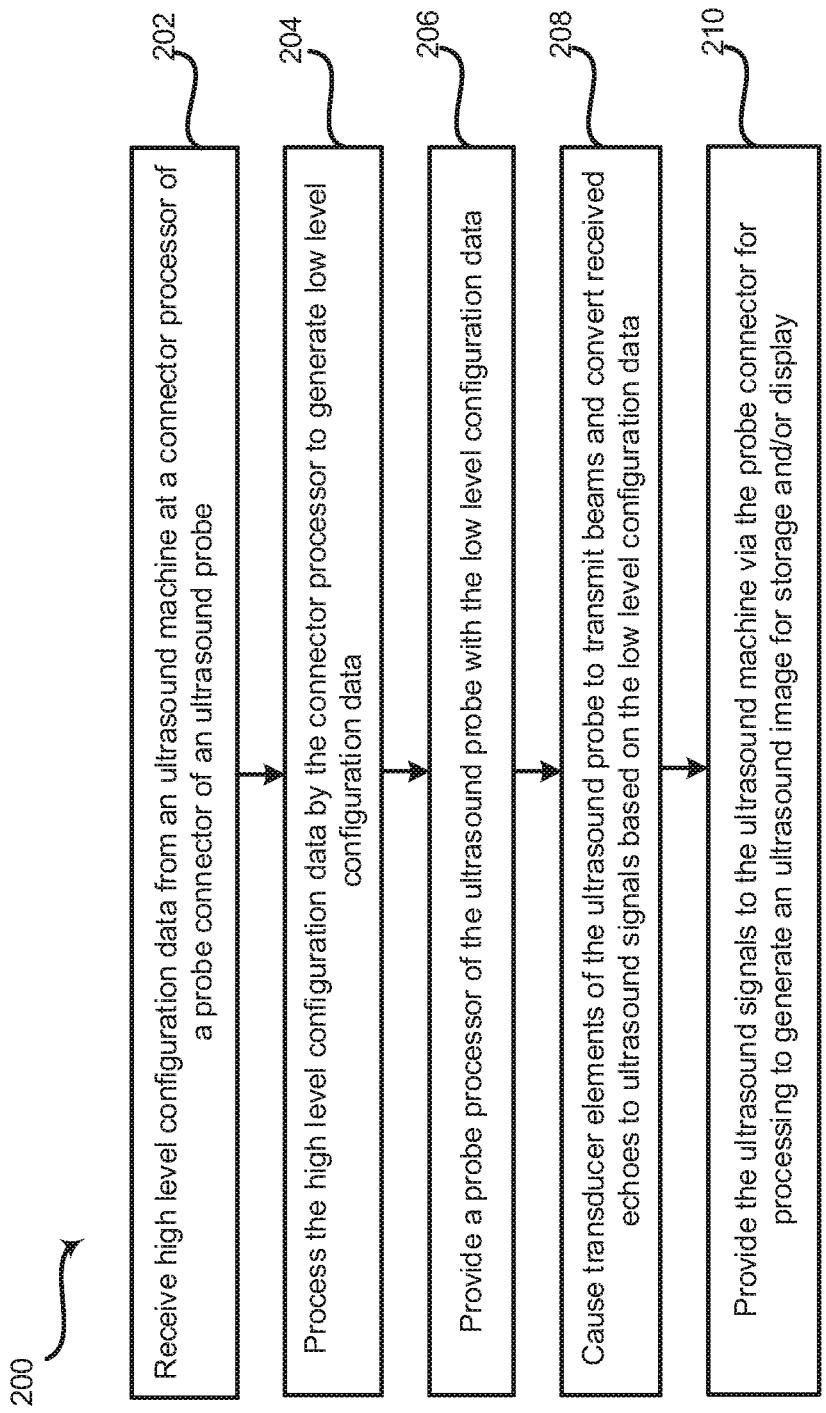
FIG. 2 is a flow chart illustrating exemplary steps that may be utilized for generating low level configuration data from high level configuration data at a probe connector of an ultrasound probe, in accordance with various embodiments.

FIG. 2 is a flow chart illustrating exemplary steps 202-210 that may be utilized for generating low level configuration data from high level configuration data at a probe connector 140 of an ultrasound probe 106, in accordance with various embodiments. Referring to FIG. 2, there is shown a flow chart 200 comprising exemplary steps 202 through 210. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 202, at least one connector processor 142 of a probe connector 140 of an ultrasound probe 106 may receive high level configuration data from an ultrasound machine 101. For example, the ultrasound probe 106 comprises a probe housing 150 (also referred to as a probe body or a probe handle) and a probe connector 140 communicatively coupled via a probe cable 152. The probe connector 140 is configured to be received at a port of the ultrasound machine 101 such that the ultrasound probe 106 is electrically connected to the ultrasound machine 101 via the probe connector 140. The probe connector 140 provides bi-directional communication between the ultrasound machine 101 and the ultrasound probe 106. Moreover, the ultrasound probe 106 may be powered by the ultrasound machine 101 via the probe connector 130. The at least one connector processor 142 may be one or more Field Programmable Gate Arrays (FPGA), one or more System on a Chip (SoC), and/or any suitable processing element. The at least one connector processor 142 may receive high level configuration data from the ultrasound machine 101, such as from the signal processor 132 and/or the transmitter 102 of the ultrasound machine 101. The high level configuration data may comprise beam configuration data, such as aperture, waveform, focus, and the like. The high level configuration data may be generated by the signal processor 132 of the ultrasound machine 101 based on transmit and receive settings. Additionally or alternatively, the high level configuration data may be generated by the transmitter 102 of the ultrasound machine 101 based on transmit and receive settings received from a transmit beamformer 104 and/or signal processor 132 of the ultrasound machine 101. The transmit and receive settings may include, for example, a transmit frequency, receive frequency, waveform shape, bandwidth, and/or any suitable transmit and receive settings. In various embodiments, the transmit and receive settings may be based on a selected or default imaging mode.

At step 204, the at least one connector processor 142 of the probe connector 140 processes the high level configuration data to generate low level configuration data. As used herein, the term "low level configuration data" refers to a greater amount of detailed configuration information (e.g., on an element by element basis) derived from the "high level configuration data," which refers to a smaller amount of generalized configuration information. For example, the low level configuration data may comprise transducer element configuration data, such as transducer element transmit delay information (e.g., a transmit grid defining the beam center trajectories of the transmit beams that is used to determine the delay for each transducer element 108) and receive delay information for each transducer element 110. In various embodiments, the processing performed by the at least one connector processor 142 to generate the low level configuration data is customized to the specific probe type and arrangement of transducer elements 108, 110 of the particular ultrasound probe 106. The at least one connector processor 142 of the probe connector 140 may be configured to translate or decompress the high level configuration data received from the transmitter 102 of the ultrasound machine 101 to generate the detailed low level configuration data. In this way, the low level configuration data is generated in closer proximity to a probe processor 112 disposed within the housing 150 of the ultrasound probe 106 than if it were generated within the ultrasound machine 101. However, the generation of the low level configuration data is provided at the probe connector 140 instead of within the probe housing 150 such that active cooling of the ultrasound probe 106 may be avoided (e.g., the probe connector 140 can more easily emit generated heat and does not have direct patient contact). Furthermore, the generation of the low level configuration data at the probe connector 140 of the ultrasound probe 106 avoids the need for extensive hardware/software co-design, complex data synchronization, and high speed interfaces between the ultrasound machine 101 and the ultrasound probe 106.

At step 206, the at least one connector processor 142 of the probe connector 140 may provide a probe processor 112 of the ultrasound probe 106 with the low level configuration data. For example, the at least one connector processor 142 of the probe connector 140 may communicate the low level configuration data to the probe processor 112 disposed within the probe housing 150 via a probe cable 152. The probe processor 112 may be configured to receive the low level configuration data for application in performing an ultrasound scan. The probe processor 112 may comprise one or more Application-Specific Integrated Circuits (ASICs) or any suitable processing element.

At step 208, the probe processor 112 of the ultrasound probe 106 may cause transducer elements 108, 110 of the ultrasound probe 106 to transmit beams and convert received echoes to ultrasound signals based on the low level configuration data. For example, the at least one probe processor 112 may be configured to apply the low level configuration data to drive the transmit transducer elements 108 to emit ultrasonic transmit beams into a region of interest. The transmitted ultrasonic beams may be back-scattered from structures in the region of interest to produce echoes. The echoes are received by the receive transducer elements 110 of the ultrasound probe 106, which may constitute the same transducer elements as the transmit transducer elements 108. The receive transducer elements 110 in the ultrasound probe 106, under the control of the probe processor 112, may be operable to convert the received echoes into analog signals. The probe processor 112 may be configured to apply the appropriate receive delays to the received signals as defined by the low level configuration data received from the at least one connector processor 142 at step 206. In various embodiments, the at least one probe processor 112 may comprise a transmit sub-aperture beamformer 114 and a receive sub-aperture beamformer 116. The at least one probe processor 112 may be configured to drive the transmit transducer elements 108 to emit the ultrasonic transmit beams via the transmit sub-aperture beamformer 114. The at least one probe processor 112 may be configured to apply the analog signals generated by the receive transducer elements 110 to the receive sub-aperture beamformer 116 to undergo sub-aperture beamforming.

At step 210, the probe processor 112 of the ultrasound probe 106 may provide the ultrasound signals to the ultrasound machine 101 via the probe connector 140 for processing to generate an ultrasound image for storage and/or display. For example, the ultrasound signals may be communicated by the at least one probe processor 112 to a receiver 118 of the ultrasound machine 101 via the probe connector 140. The receiver 118 may be operable to receive the ultrasound signals and communicate these analog ultrasound signals to one or more of a plurality of A/D converters 122. The plurality of A/D converters 122 may convert the analog signals from the receiver 118 to corresponding digital signals. The digital signals may be communicated to an RF processor 124, which may be operable to demodulate the digital signals output by the plurality of A/D converters 122. For example, the RF processor 124 may comprise a complex demodulator (not shown) that is operable to demodulate the digital signals to form I/Q data pairs that are representative of the corresponding echo signals. The RF or I/Q signal data may then be communicated to an RF/IQ buffer 126. The RF/IQ buffer 126 may be operable to provide temporary storage of the RF or I/Q signal data, which is generated by the RF processor 124. A receive beamformer 120 of the ultrasound machine 101 may perform digital beamforming processing to, for example, sum the delayed channel signals received from RF processor 124 via the RF/IQ buffer 126 and output a beam summed signal. The resulting processed information may be the beam summed signal that is output from the receive beamformer 120 and communicated to a signal processor 132. The signal processor 132 may process the ultrasound scan data (i.e., summed IQ signal) to generate ultrasound images, which may be presented at a display system 134 and/or may be stored at an archive 138. The archive 138 may be a local archive, a Picture Archiving and Communication System (PACS), or any suitable device for storing images and related information.

Various embodiments of the present disclosure describe an ultrasound probe 106 that provides less power dissipation in the probe housing 150 by performing the low level configuration data generation (e.g., delay computations) at the probe connector 140 instead of within the probe housing 150, resulting in the reduction or elimination of probe cooling needs, which allows for improved ergonomics of the ultrasound probe housing 150. Furthermore, aspects of the present disclosure describe an ultrasound system 100 that provides less computational requirements in the ultrasound machine 101 by performing the low level configuration data generation (e.g., delay computations) at the probe connector 140 instead of at the ultrasound machine 101, which may result in faster response times between the ultrasound probe 106 and the ultrasound machine 101 to improve usability of the ultrasound system 100. In addition, certain embodiments of the present disclosure reduce the amount of data transferred between the ultrasound machine 101 and the ultrasound probe 106 by transmitting the high level configuration data from the ultrasound machine 101 to the ultrasound probe 106, instead of the substantially greater amount of data of the low level configuration data.

Aspects of the present disclosure provide a method 200 and system 100 for generating low level configuration data from high level configuration data at a probe connector 140 of an ultrasound probe 106. In accordance with various embodiments, the method 200 may comprise receiving 202, from an ultrasound machine 101 by at least one connector processor 142 located in a probe connector 140 of an ultrasound probe 106, high level configuration data. The method 200 may comprise processing 204, by the at least one connector processor 142, the high level configuration data to generate low level configuration data. The method 200 may comprise providing 206, by the at least one connector processor 142 via a probe cable 152 to at least one probe processor 112 disposed in a housing 150 of the ultrasound probe 106, the low level configuration data. The method 200 may comprise causing 208, by the at least one probe processor 112, transducer elements 108, 110 of the ultrasound probe 106 to transmit ultrasound beams and convert received echoes to ultrasound signals based on the low level configuration data.

In an exemplary embodiment, the high level configuration data is beam configuration data comprising aperture, waveform, and/or focus. In a representative embodiment, the low level configuration data is transducer element configuration data comprising delays for the transducer elements 108, 110. In various embodiments, the ultrasound probe 106 is a four-dimensional (4D) probe. In certain embodiments, the at least one connector processor 142 comprises one or both of a Field Programmable Gate Array (FPGA) or a System on a Chip (SoC). In an exemplary embodiment, the at least one probe processor 112 comprises an Application-Specific Integrated Circuit (ASIC). In certain embodiments, the at least one probe processor 112 is configured to perform sub-aperture beamforming based on the low level configuration data.

Various embodiments provide an ultrasound probe 106 comprising a probe connector 140 configured to generate low level configuration data from high level configuration data received from an ultrasound machine 101. The ultrasound probe 106 may comprise at least one probe processor 112 and transducer elements 108, 110 disposed in a probe housing 150. The ultrasound probe 106 may comprise a probe connector 140 configured to be received by an ultrasound machine 101. The probe connector 140 may comprise at least one connector processor 142 communicatively coupled to the at least one probe processor 112 by a probe cable 152. The at least one connector processor 142 is configured to receive high level configuration data from the ultrasound machine 101. The at least one connector processor 142 is configured to process the high level configuration data to generate low level configuration data. The at least one connector processor 142 is configured to provide the low level configuration data to the at least one probe processor 112 via the probe cable 152. The at least one probe processor 112 is configured to cause the transducer elements 108, 110 to transmit ultrasound beams and convert received echoes to ultrasound signals based on the low level configuration data.

In a representative embodiment, the high level configuration data is beam configuration data comprising aperture, waveform, and/or focus. In various embodiments, the low level configuration data is transducer element configuration data comprising delays for the transducer elements 108, 110. In certain embodiments, the ultrasound probe 106 is a four-dimensional (4D) probe. In an exemplary embodiment, the at least one connector processor 142 comprises one or both of a Field Programmable Gate Array (FPGA) or a System on a Chip (SoC). In a representative embodiment, the at least one probe processor 112 comprises an Application-Specific Integrated Circuit (ASIC). In various embodiments, the at least one probe processor 112 is configured to perform sub-aperture beamforming based on the low level configuration data.

Certain embodiments provide an ultrasound system 100 comprising an ultrasound machine 101 and an ultrasound probe 106 having a probe connector 140 configured to generate low level configuration data from high level configuration data received from the ultrasound machine 101. The ultrasound system 100 may comprise an ultrasound machine 101 and an ultrasound probe 106. The ultrasound probe 106 may comprise at least one probe processor 112 and transducer elements 108, 110 disposed in a probe housing 150. The ultrasound probe 106 may comprise a probe connector 140 configured to be received by the ultrasound machine 101. The probe connector 140 may comprise at least one connector processor 142 communicatively coupled to the at least one probe processor 112 by a probe cable 152. The at least one connector processor 142 is configured to receive high level configuration data from the ultrasound machine 101. The at least one connector processor 142 is configured to process the high level configuration data to generate low level configuration data. The at least one connector processor 142 is configured to provide the low level configuration data to the at least one probe processor 112 via the probe cable 152. The at least one probe processor 112 is configured to cause the transducer elements 108, 110 to transmit ultrasound beams and convert received echoes to ultrasound signals based on the low level configuration data.

In various embodiments, the high level configuration data is beam configuration data comprising aperture, waveform, and/or focus. In certain embodiments, the low level configuration data is transducer element configuration data comprising delays for the transducer elements 108, 110. In an exemplary embodiment, the ultrasound probe 106 is a four-dimensional (4D) probe. In a representative embodiment, the at least one connector processor 142 comprises one or both of a Field Programmable Gate Array (FPGA) or a System on a Chip (SoC). In various embodiments, the at least one probe processor 112 comprises an Application-Specific Integrated Circuit (ASIC).

As utilized herein the term "circuitry" refers to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for generating low level configuration data from high level configuration data at a probe connector of an ultrasound probe.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
   receiving, from an ultrasound machine by at least one connector processor located in a probe connector of an ultrasound probe, high level configuration data;
   processing, by the at least one connector processor, the high level configuration data to generate low level configuration data;
   providing, by the at least one connector processor via a probe cable to at least one probe processor disposed in a housing of the ultrasound probe, the low level configuration data; and
   causing, by the at least one probe processor, transducer elements of the ultrasound probe to transmit ultrasound beams and convert received echoes to ultrasound signals based on the low level configuration data.

2. The method of claim 1, wherein the high level configuration data is beam configuration data comprising aperture, waveform, and/or focus.

3. The method of claim 1, wherein the low level configuration data is transducer element configuration data comprising delays for the transducer elements.

4. The method of claim 1, wherein the ultrasound probe is a four-dimensional (4D) probe.

5. The method of claim 1, wherein the at least one connector processor comprises one or both of a Field Programmable Gate Array (FPGA) or a System on a Chip (SoC).

6. The method of claim 1, wherein the at least one probe processor comprises an Application-Specific Integrated Circuit (ASIC).

7. The method of claim 1, wherein the at least one probe processor is configured to perform sub-aperture beamforming based on the low level configuration data.

8. An ultrasound probe comprising:
   at least one probe processor and transducer elements disposed in a probe housing; and
   a probe connector configured to be received by an ultrasound machine, the probe connector comprising at least one connector processor communicatively coupled to the at least one probe processor by a probe cable, wherein:
   the at least one connector processor is configured to:
      receive high level configuration data from the ultrasound machine,
      process the high level configuration data to generate low level configuration data, and
      provide the low level configuration data to the at least one probe processor via the probe cable, and
   the at least one probe processor is configured to cause the transducer elements to transmit ultrasound beams and convert received echoes to ultrasound signals based on the low level configuration data.

9. The ultrasound probe of claim 8, wherein the high level configuration data is beam configuration data comprising aperture, waveform, and/or focus.

10. The ultrasound probe of claim 8, wherein the low level configuration data is transducer element configuration data comprising delays for the transducer elements.

11. The ultrasound probe of claim 8, wherein the ultrasound probe is a four-dimensional (4D) probe.

12. The ultrasound probe of claim 8, wherein the at least one connector processor comprises one or both of a Field Programmable Gate Array (FPGA) or a System on a Chip (SoC).

13. The ultrasound probe of claim 8, wherein the at least one probe processor comprises an Application-Specific Integrated Circuit (ASIC).

14. The ultrasound probe of claim 8, wherein the at least one probe processor is configured to perform sub-aperture beamforming based on the low level configuration data.

15. An ultrasound system comprising:
   an ultrasound machine; and
   an ultrasound probe comprising:
      at least one probe processor and transducer elements disposed in a probe housing; and
      a probe connector configured to be received by the ultrasound machine, the probe connector comprising at least one connector processor communicatively coupled to the at least one probe processor by a probe cable, wherein:
      the at least one connector processor is configured to:
         receive high level configuration data from the ultrasound machine,
         process the high level configuration data to generate low level configuration data, and
         provide the low level configuration data to the at least one probe processor via the probe cable, and
      the at least one probe processor is configured to cause the transducer elements to transmit ultrasound beams and convert received echoes to ultrasound signals based on the low level configuration data.

16. The ultrasound system of claim 15, wherein the high level configuration data is beam configuration data comprising aperture, waveform, and/or focus.

17. The ultrasound system of claim 15, wherein the low level configuration data is transducer element configuration data comprising delays for the transducer elements.

18. The ultrasound system of claim 15, wherein the ultrasound probe is a four-dimensional (4D) probe.

19. The ultrasound system of claim 15, wherein the at least one connector processor comprises one or both of a Field Programmable Gate Array (FPGA) or a System on a Chip (SoC).

20. The ultrasound system of claim 15, wherein the at least one probe processor comprises an Application-Specific Integrated Circuit (ASIC).

* * * * *